United States Patent
Wang

(10) Patent No.: US 8,712,090 B2
(45) Date of Patent: Apr. 29, 2014

(54) HEADSET, TERMINAL, AND METHOD CAPABLE OF SWITCHING HEADSET MODE

(71) Applicant: Huawei Device Co., Ltd., Shenzhen (CN)

(72) Inventor: Xiao Wang, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/722,651

(22) Filed: Dec. 20, 2012

(65) Prior Publication Data

US 2014/0010398 A1 Jan. 9, 2014

(30) Foreign Application Priority Data

Jan. 29, 2012 (CN) .......................... 2012 1 0020410

(51) Int. Cl.
*H04R 25/00* (2006.01)

(52) U.S. Cl.
USPC .......................................... 381/384; 381/370

(58) Field of Classification Search
USPC .......... 381/384, 370, 315, 331; 439/638, 668, 439/669
See application file for complete search history.

(56) References Cited

U.S. PATENT DOCUMENTS

| | | | |
|---|---|---|---|
| 7,537,490 B1 * | 5/2009 | Hovey et al. ................... | 381/384 |
| 7,699,664 B2 * | 4/2010 | Kim et al. ...................... | 381/384 |
| 8,155,337 B2 * | 4/2012 | Choi et al. ..................... | 381/384 |
| 8,295,532 B2 * | 10/2012 | Hsu et al. ...................... | 381/384 |
| 8,625,814 B2 * | 1/2014 | Yang et al. ..................... | 381/384 |

FOREIGN PATENT DOCUMENTS

| | | |
|---|---|---|
| CN | 2796253 Y | 7/2006 |
| CN | 2899356 Y | 5/2007 |
| CN | 101527156 A | 9/2009 |
| CN | 101867657 A | 10/2010 |
| CN | 102572635 A | 7/2012 |
| WO | WO 2007035021 A1 | 3/2007 |
| WO | WO 2008028175 A2 | 3/2008 |

OTHER PUBLICATIONS

International Search Report issued in corresponding PCT Patent Application No. PCT/CN2012/087172, mailed Apr. 4, 2013.
Extended European Search Report issued in corresponding European Patent Application No. 12199573.2, mailed Apr. 15, 2013.
Office Action issued in corresponding Chinese Patent Application No. 20120020410.3, mailed Jul. 23, 2013, 9 pages.

* cited by examiner

*Primary Examiner* — Suhan Ni
(74) *Attorney, Agent, or Firm* — Brinks, Gilson & Lione

(57) ABSTRACT

A headset includes a Bluetooth headset body, a microphone, and at least one speaker. The Bluetooth headset body includes a Bluetooth headset main-board and a battery. Interfaces provided by the Bluetooth headset main-board include the interfaces for the microphone and the speaker. Anodes of the microphone and the at least one speaker are connected to the corresponding interfaces of the Bluetooth headset main-board, respectively, and their cathodes are connected to a ground cable, respectively. The headset further includes: a headset plug, where interfaces of the headset plug are correspondingly and electrically connected to the anode of the at least one speaker, the ground cable, and the anode of the microphone, respectively; and connections between the anode of the microphone and of the at least one speaker and the corresponding interfaces of the Bluetooth headset main-board are disconnected after the headset plug is plugged in the external headset jack.

9 Claims, 1 Drawing Sheet

HEADSET, TERMINAL, AND METHOD CAPABLE OF SWITCHING HEADSET MODE

CROSS-REFERENCE TO RELATED APPLICATIONS

This application claims priority to Chinese Patent Application No. 201210020410.3, filed on Jan. 29, 2012, which is hereby incorporated by reference in its entirety.

FIELD OF THE INVENTION

The present invention relates to the field of an electronic technology, and in particular, to a headset, a terminal, and a method capable of switching a headset mode.

BACKGROUND OF THE INVENTION

At present, electronic product accessories, such as a headset, are very common in application. There are mainly two types of headsets, one is a common plug-in headset, and the other is a Bluetooth headset. The Bluetooth headset can eliminate bondage of a headset connecting line on a user, and greatly facilitate the usage of the user. However, the Bluetooth headset needs to be charged, and is unable to be used without electricity. And when the Bluetooth headset is used together with a corresponding electronic product, power consumption of the electronic product is increased.

SUMMARY OF THE INVENTION

Embodiments of the present invention provide a headset, a terminal, and a method capable of switching a headset mode, so that a Bluetooth headset mode can be switched to a common headset mode. When a Bluetooth headset runs out of power, a common headset can still be used, and power consumption of an electronic product can be decreased.

In one aspect, an embodiment of the present invention provides a headset capable of switching a headset mode, including a Bluetooth headset body, a microphone, and at least one speaker; where the Bluetooth headset body is configured to perform Bluetooth communication, and transmit an audio signal, and it includes a Bluetooth headset main-board and a battery supplying power to the Bluetooth headset main-board, where interfaces provided by the Bluetooth headset main-board include interfaces for the microphone and the speaker; and anodes of the microphone and the at least one speaker are connected to the corresponding interfaces of the Bluetooth headset main-board, respectively, and their cathodes are connected to a ground cable, respectively.

The headset further includes:

a headset plug, configured to transmit the audio signal after being plugged in an external headset jack;

where interfaces of the headset plug are correspondingly and electrically connected to the anode of the at least one speaker, the ground cable, and the anode of the microphone, respectively; and connections between the anodes of the microphone and of the at least one speaker and the corresponding interfaces of the Bluetooth headset main-board are disconnected after the headset plug is plugged in the external headset jack.

In another aspect, an embodiment of the present invention provides a terminal capable of switching a headset mode; where the terminal matches the foregoing headset capable of switching the headset mode. The terminal includes:

a headset jack, configured to perform transmission of an audio signal after a headset plug is plugged in;

a Bluetooth headset signal transceiver module, configured to perform transmission of signal and data with a Bluetooth headset body in the foregoing headset capable of switching the headset mode; and a processor, configured to, after the headset plug is detected to be plugged in the headset jack, send an audio channel switching instruction to the Bluetooth headset signal transceiver module, and switch an audio channel from a Bluetooth headset audio channel to a common headset audio channel which corresponds to the headset jack.

In another aspect, the embodiment of the present invention further provides a method capable of switching a headset mode, where a headset includes a Bluetooth headset body, a headset plug, a microphone, and at least one speaker. The Bluetooth headset body is configured to perform Bluetooth communication and transmit an audio signal, and it includes a Bluetooth headset main-board and a battery supplying power to the Bluetooth headset main-board, where interfaces provided by the Bluetooth headset main-board include the interfaces for the microphone and the speaker; and anodes of the microphone and the at least one speaker are connected to the corresponding interfaces of the Bluetooth headset main-board, respectively, and their cathodes are connected to a ground cable, respectively.

The method includes:

correspondingly and electrically connecting the interfaces of the headset plug and the anode of the at least one speaker, the ground cable, and the anode of the microphone, respectively; and after the headset plug is detected to be plugged in a headset jack, disconnecting connections between the anodes of the microphone and of the at least one speaker and the corresponding interfaces of the Bluetooth headset main-board, and switching an audio channel from a Bluetooth headset audio channel to a common headset audio channel which corresponds to the headset jack.

Compared with the prior art, embodiments of the present invention have the following beneficial effects:

a headset, a terminal, and a method capable of switching a headset mode provided in the embodiments of the present invention simultaneously have advantages of the Bluetooth headset and a common plug-in headset, and are capable of switching from the Bluetooth headset mode to the common headset mode. When the Bluetooth headset runs out of power, the common headset can still be used, and the power consumption of the electronic product can be decreased; the two headset modes share the microphone and the speaker, so as to increase the component utilizing efficiency, reduce the cost, save the volume of the headset, and be convenient for a user to carry and use.

BRIEF DESCRIPTION OF THE DRAWINGS

To illustrate the technical solutions of the embodiments of the present invention more clearly, the accompanying drawings required for describing the embodiments are briefly introduced in the following. Apparently, the accompanying drawings in the following description are merely some embodiments of the present invention. Persons of ordinary skill in the art may further derive other drawings according to these accompanying drawings without creative efforts.

DETAILED DESCRIPTION OF THE EMBODIMENTS

The technical solutions in the embodiments of the present invention are described clearly and completely in the following with reference to the accompanying drawings in the embodiments of the present invention. Apparently, the described embodiments are only some embodiments of the present invention, rather than all embodiments. Based on the embodiments of the present invention, all other embodiments obtained by persons of ordinary skill in the art without making any creative effort shall fall within the protection scope of the present invention.

In an embodiment of a headset capable of switching a headset mode provided in the present invention, the headset includes a Bluetooth headset body, a microphone, and at least one speaker.

The Bluetooth headset body is configured to perform Bluetooth communication and transmit an audio signal, and it includes a Bluetooth headset main-board and a battery supplying power to the Bluetooth headset main-board, where interfaces provided by the Bluetooth headset main-board include the interfaces for the microphone and the speaker.

Anodes of the microphone and the at least one speaker are connected to the corresponding interfaces of the Bluetooth headset main-board, respectively, and their cathodes are connected to a ground cable, respectively.

The headset further includes:

a headset plug, configured to transmit the audio signal after being plugged in an external headset jack; where the interfaces of the headset plug are correspondingly and electrically connected to the anode of the at least one speaker, the ground cable and the anode of the microphone, respectively; and connections between the anodes of the microphone and of the at least one speaker and the corresponding interfaces of the Bluetooth headset main-board are disconnected after the headset plug is plugged in the external headset jack.

The cathode described in the specification refers to one end connected to the ground cable. The anode is opposite to the cathode and refers to one end that is not connected to the ground cable.

Figure 1:
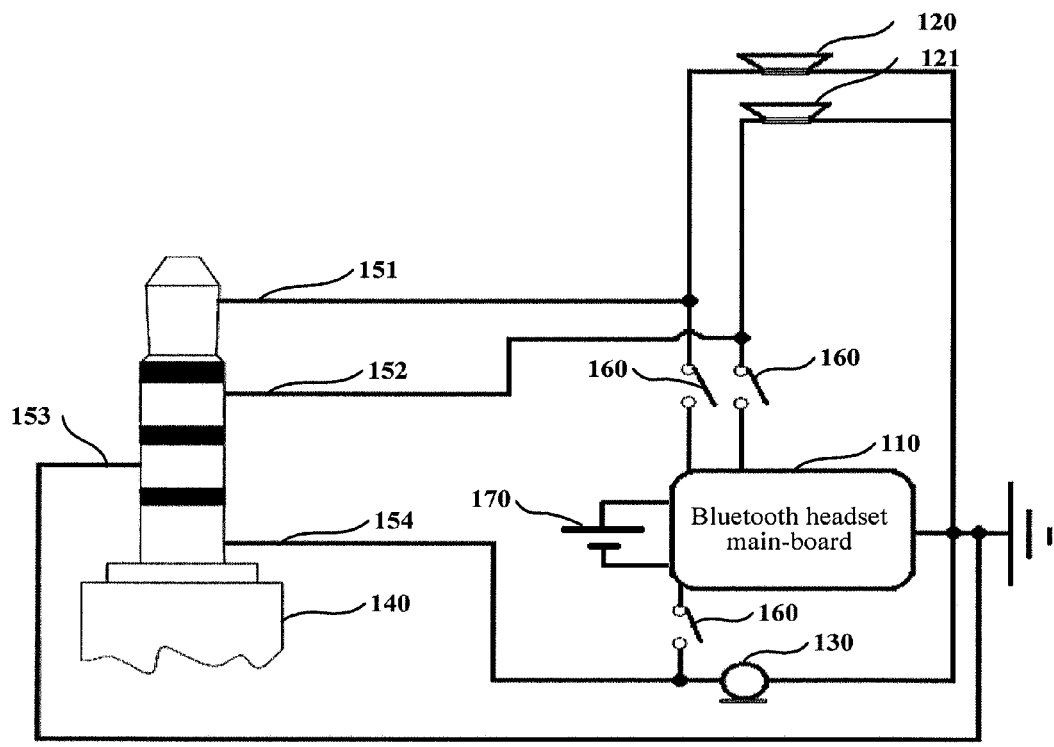
FIG. 1 is a schematic structural diagram of a circuit of a headset capable of switching a headset mode according to an embodiment of the present invention.

As shown in FIG. 1, it is a schematic structural diagram of a circuit of the headset capable of switching the headset mode according to the present invention. The headset includes the Bluetooth headset body, a microphone 130 and two speakers 120 and 121. The Bluetooth headset body may include a Bluetooth headset main-board 110 and a battery 170 supplying power to the Bluetooth headset main-board 110. The Bluetooth headset main-board 110 is configured to perform Bluetooth communication and transmit the audio signal. Interfaces provided by the Bluetooth headset main-board 110 include an interface for the microphone and interfaces for a left channel speaker and a right channel speaker, and so on.

Anodes of the microphone 130 and the speakers 120 and 121 are connected to the corresponding interfaces of the Bluetooth headset main-board 110, respectively, and their cathodes are connected to the ground cable, respectively. One end of the microphone 130 is the anode and is connected to the corresponding interface (that is, the interface for the microphone) of the Bluetooth headset main-board 110, and the other end is the cathode and is connected to the ground cable. The speakers 120 and 121 may be a left channel speaker and a right channel speaker, respectively. One end of the speakers 120 and that of the speaker 121 are the anodes and are connected to the corresponding interfaces (that is, the interfaces for the left channel speaker and the right channel speaker) of the Bluetooth headset main-board 110, respectively, and the other ends are the cathodes and are connected to the ground cable, respectively.

The headset further includes:

a headset plug 140, configured to transmit the audio signal after being plugged in the external headset jack; where the interfaces of the headset plug 140 are correspondingly and electrically connected to the anodes of the speakers 120 and 121, the ground cable and the anode of the microphone 130, respectively; and connections between the anodes of the microphone 130 and of the speakers 120 and 121 and the corresponding interfaces of the Bluetooth headset main-board 110 are disconnected after the headset plug 140 is plugged in the external headset jack.

After the headset plug 140 is plugged in the external headset jack, the connections between one end of the microphone 130, of the speakers 120, and of the speaker 121 and the corresponding interfaces of the Bluetooth headset main-board 110 are disconnected. Therefore, the headset can be switched from a Bluetooth headset mode to a common headset mode; when a Bluetooth headset runs out of power, a common headset can still be used and power consumption of an electronic product can be decreased; the two headset modes share the microphone and the speaker, so as to increase the component utilizing efficiency, reduce the cost, save the volume of the headset and be convenient for a user to carry and use.

The interfaces of the headset plug 140 are the interfaces which correspond to each pole on the headset plug 140. In FIG. 1, the headset plug 140 has four poles from top to bottom, which may correspond to a left channel, a right channel, the ground cable, and the microphone, respectively.

The interfaces of the headset plug 140 being correspondingly and electrically connected to the anodes of the speakers 120 and 121, the ground cable and the anode of the microphone 130, respectively, may specifically be that each of the interfaces of the headset plug 140 is correspondingly connected, through a connecting line, to the anodes of the speakers 120 and 121, the ground cable and the anode of the microphone 130.

The headset may further include a line retracting module, configured to accommodate the connecting line and control spreading and retracting of the connecting line.

The connecting line may include four connection lines. As shown in FIG. 1, the four connection lines are connection lines 151, 152, 153 and 154, respectively. The connection lines 151, 152, 153 and 154 may be a left channel connection line, a right channel connection line, a ground connection line and a microphone connection line, respectively. One ends of the four connection lines are connected to corresponding interfaces (that is, the interfaces which correspond to the four poles on the headset plug 140) of the headset plug 140, respectively, and the other ends of the four connection lines are correspondingly and electrically connected to the anodes of the speakers 120 and the speakers 121, the ground cable, and the anode of the microphone 130.

The headset plug 140 may also have only three poles. When there are only three poles, the headset plug 140 may be a mono headset plug and the three poles may correspond to the left/right channel, the ground cable, and the microphone, respectively. In this case, the connecting line may also include only three connection lines which are the left or right channel connection line, the ground connection line, and the microphone connection line, respectively. The three connection lines have one ends connected to the corresponding interfaces of the three poles of the headset plug, and the other ends of the three connecting lines are correspondingly and electrically connected to the anodes of the left/right channel speaker 120/121, the ground line and the anode of the microphone 130, respectively. In this case, the headset may be a single-ear mono headset, that is, it may only include the Bluetooth headset body, the microphone and one speaker, where the speaker is the left/right channel speaker and is the same as the channel of the pole which corresponds to the channel in the headset plug. Definitely, when the headset plug is a mono headset plug with only three poles, the headset may also be a binaural double channel headset, that is, it includes two speakers. Therefore, the three poles of the headset plug only need to be connected to the anodes of the corresponding components (such as the corresponding microphone, the speaker with the same channel) in the handset and the ground cable through the corresponding connection lines, respectively, that is, it may be implemented that the same components can be shared under the two headset modes.

For the single-ear mono headset, only one speaker is included, that is, only one channel in the left channel and the right channel is included; for the binaural headset, two speakers are included and generally double channels are included, that is, the left channel and right channel are included.

Optionally, for the four poles or three poles on the headset plug, a sequence between each pole may be changed; correspondingly, the connecting sequence between each pole and each piece of connection lines of the connecting line is changed correspondingly, so as to form the corresponding connections. The headset plug may include at least three poles and only one implementation manner is provided in the embodiment of the present invention. The number of the poles of the headset plug and the sequence of the poles are not limited in the present invention, which is subject to the actual headset plug.

Optionally, in one embodiment of the headset capable of switching the headset mode provided in the present invention, the headset may further include a line retracting module, configured to accommodate the connecting line and control spreading and retracting of the connecting line. The line retracting module may be a coil spring, or be called as clockwork. Through the function of the clockwork, when the user needs to use a common headset mode, the headset plug with the connecting line connected to it can be drawn out from the headset, and the length of the drawn-out connecting line can be controlled according to requirements. When the common headset mode is not required to be used, through the function of the clockwork, the user can furl and save the connecting line by a one-touch operation. The component capable of fixing the headset plug can further be set on the headset, such as a slot or an aperture which corresponds to the headset plug, so that after the connecting line is furled, the headset plug can be fixed by being put in the slot or the aperture for convenient carrying and protecting of the headset plug.

Optionally, in an embodiment of a headset capable of switching a headset mode provided in the present invention, the headset may further include at least two electronic switches.

The anodes of the microphone and the at least one speaker are connected to the corresponding interfaces of the Bluetooth headset main-board specifically through the at least two electronic switches.

The connection is disconnected specifically through disconnecting the at least two electronic switches.

Optionally, the number of the electronic switches may be two or three. The number of the speakers may be one or two.

Specifically, when the headset has two speakers, such as 120 and 121, the headset may further include three electronic switches 160 which are used to control closing or disconnecting of the connections between the two speakers 120 and 121 and one microphone 130, and the corresponding interfaces of the Bluetooth headset main-board 110, so as to achieve the switching between the two headset modes. When the three electronic switches 160 are closed, the connections are closed and the headset is in the Bluetooth headset mode; under this mode, the user can use a Bluetooth headset function of the headset. When the three electronic switches 160 are disconnected, the connection is disconnected and the headset is switched to the common headset mode; under this mode, the user can use a common headset function of the headset. After the headset plug 140 is plugged in the external headset jack, the three electronic switches 160 are disconnected, thereby achieving the switching from the Bluetooth headset mode to the common headset mode.

Optionally, when the headset has only one speaker 120/121, the headset may include two electronic switches 160 which are used to control the closing or disconnecting of the connections between the anodes of the speaker 120/121 and of the microphone 130 and the corresponding interfaces of the Bluetooth headset main-board 110, so as to achieve the switching between the two headset modes.

Optionally, the closing or disconnecting of the connections between the anodes of the one or two speakers and of the microphone and the corresponding interfaces of the Bluetooth headset main-board can also be controlled in another manner to achieve the switching between the two headset modes. For example, a control signal can be sent through a processing unit or a control unit on the Bluetooth headset main-board to the interfaces which are connected to the anodes of the one or two speakers and the microphone on the Bluetooth headset main-board so as to control the closing or disconnecting of the connections between the anodes of the one or two speakers and of the microphone and the corresponding interfaces of the Bluetooth headset main-board.

Optionally, in an embodiment of a headset capable of switching a headset mode provided in the present invention, the at least two electronic switches can specifically be closed or disconnected under the control of a switch closing instruction or a switch disconnecting instruction sent by the Bluetooth headset main-board, thereby controlling the closing or disconnecting of the connections between the anodes of the at least one speaker and of the microphone and the corresponding interfaces of the Bluetooth headset main-board, and further achieving the switching of the headset between the Bluetooth headset mode and the common headset mode. The type of the switch closing instruction or the switch disconnecting instruction can be a level signal.

Specifically, a terminal includes a Bluetooth headset signal transceiver module and a headset jack. When a processor of the terminal detects that the headset plug is plugged in the headset jack on the terminal, an audio channel switching instruction may be sent to the Bluetooth headset signal transceiver module, and the audio channel is switched from a Bluetooth headset audio channel to a common headset audio channel which corresponds to the headset jack. After the audio channel switching instruction is received, the Bluetooth headset signal transceiver module can send a message to the Bluetooth headset main-board of the headset. Bluetooth communication or the Bluetooth audio channel can be disconnected under the instruction of the message. Therefore, after the message is received, the Bluetooth headset main-board of the headset can control the disconnection of the at least two electronic switches through sending the switch disconnecting instruction, thereby achieving the switching of the headset from the Bluetooth headset mode to the common headset mode.

In a headset capable of switching a headset mode provided in the embodiment of the present invention, it may also switch from the common headset mode to the Bluetooth headset mode. Specifically, after pulling out the headset plug from the corresponding headset jack by the user, a Bluetooth headset module is activated by pressing a power button of the Bluetooth headset module; after the Bluetooth handset main-board is powered on, an initial switch closing instruction may be sent to the at least two electronic switches to switch the at least two electronic switches from a disconnected state to a closed state, that is, the Bluetooth headset mode can be used, thereby achieving the switching from the common headset mode to the Bluetooth headset mode. The switch closing instruction can also be sent when the Bluetooth headset module prepares to perform the Bluetooth communication with an external terminal, which is not limited in the embodiment of the present invention; it only needs to be guaranteed that the at least two electronic switches can be controlled to be in the closed state when the Bluetooth headset mode is used, and the at least two electronic switches can be controlled to be in the disconnected state when the common headset mode is used.

Optionally, in a headset capable of switching a headset mode provided in the embodiment of the present invention, the headset may further include a selection button, the user is able to select between the common headset mode and the Bluetooth headset mode through the selection button; the closing or disconnecting of the at least two electronic switches is specifically controlled by the selection button.

Another manner may also be adopted for a method of controlling the closing or the disconnecting of the electronic switch. The method for controlling the closing or the disconnecting of the electronic switch is not limited in the embodiment of the present invention; it only needs to be guaranteed that the at least two electronic switches can be controlled to be in the closed state when the Bluetooth headset mode is used and the at least two electronic switches can be controlled to be in the disconnected state when the common headset mode is used.

The headset capable of switching a headset mode provided in the embodiment of the present invention has advantages of the Bluetooth headset and the common plug-in headset, and can be switched from the Bluetooth headset mode to the common headset mode; when the Bluetooth headset runs out of power, the common headset can still be used and power consumption of an electronic product can be decreased; the two headset modes share the microphone and the speaker, so as to increase the component utilizing efficiency, reduce the cost, save the volume of the headset and be convenient for the user to carry and use.

Figure 2:
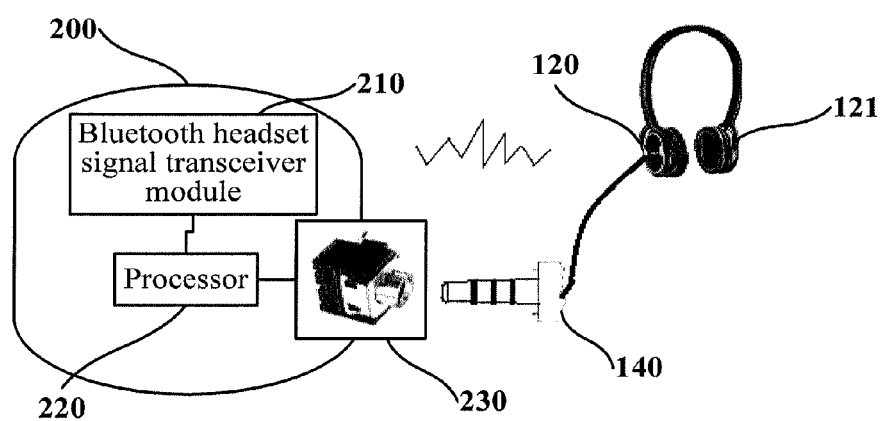
FIG. 2 is a schematic structural diagram of a terminal capable of switching a headset mode and a headset capable of switching a headset mode according to an embodiment of the present invention.

An embodiment of the present invention further provides a terminal capable of switching a headset mode and matching the foregoing headset capable of switching the headset mode. As shown in FIG. 2, the terminal 200 includes:

a headset jack 230, configured to transmit an audio signal after a headset plug 140 is plugged in, where the headset plug 140 matches the headset jack 230; in FIG. 2, the headset jack 230 is located at an edge of the terminal 200 for a convenient interconnection with the headset plug 140. The headset jack 230 shown in FIG. 2 is only a schematic diagram of the headset jack, and details are subject to the actual headset jack;

a Bluetooth headset signal transceiver module 210, configured to perform transmission of signal and data with a Bluetooth headset body in the foregoing headset capable of switching the headset mode; and a processor 220, configured to, after the headset plug 140 is detected to be plugged in the headset jack 230, send an audio channel switching instruction to the Bluetooth headset signal transceiver module 210, and switch an audio channel from a Bluetooth headset audio channel to a common headset audio channel which corresponds to the headset jack. There are many methods for detecting whether the headset plug is plugged in the headset jack, and conventional methods can be adopted, which are not limited in the present invention.

The audio channel switching instruction is used to represent the instruction or the signal instructing the terminal to perform switching of the audio channel. The processor can send the audio channel switching instruction to the Bluetooth headset signal transceiver module 210, or send a part of instructions of the audio channel switching instruction, such as the instruction of closing the Bluetooth audio channel, to the Bluetooth headset signal transceiver module 210, and switch the audio channel from the Bluetooth headset audio channel to the common headset audio channel which corresponds to the headset jack. Therefore, the switching of the terminal from a Bluetooth headset mode to a common headset mode is achieved.

After the audio channel switching instruction is received, the Bluetooth headset signal transceiver module 210 can send the corresponding instruction or signal to a Bluetooth headset main-board, so as to enable the Bluetooth headset main-board to disconnect an electronic switch by controlling the electronic switch, thereby achieving the switching of the headset from the Bluetooth headset mode to the common headset mode.

As shown in FIG. 2, the Bluetooth headset main-board of the headset is located on one side of a speaker 120 (not shown in the figure). When the headset is in the Bluetooth headset mode, wireless transmission of signal and data can be performed between the Bluetooth headset main-board and the Bluetooth headset signal transceiver module 210 of the terminal 200. The headset plug 140 is connected to a corresponding interface of a Bluetooth headset module through a connecting line shown in the diagram. The connecting line can be spread and retracted through clockwork. FIG. 2 is only a schematic structural diagram of a terminal capable of switching a headset mode and a headset capable of switching a headset mode, and only a part of structure of the headset is shown in FIG. 2. For the structure of the headset, reference may be made to the foregoing embodiment of a headset capable of switching a headset mode and the headset can also have another structure, which is not limited in the present invention.

The terminal provided in the embodiment of the present invention may switch from the Bluetooth headset mode to the common headset mode; when the Bluetooth headset runs out of power, a common headset can still be used and power consumption of the terminal can be decreased; the two headset modes share a microphone and the speaker, so as to increase the component utilizing efficiency, reduce the cost, save the volume of the headset and be convenient for a user to carry and use.

In another aspect, an embodiment of the present invention further provides a method capable of switching a headset mode. In the method, one headset includes a Bluetooth headset body, a headset plug, a microphone and at least one speaker. The Bluetooth headset body is configured to perform Bluetooth communication and transmit an audio signal, and it includes a Bluetooth headset main-board and a battery supplying power to the Bluetooth headset main-board, where interfaces provided by the Bluetooth headset main-board include the interfaces for the microphone and the speaker.

Anodes of the microphone and the at least one speaker are connected to the corresponding interfaces of the Bluetooth headset main-board, respectively, and their cathodes are connected to a ground cable, respectively.

The method includes:

correspondingly and electrically connecting the interfaces of the headset plug and the anode of the at least one speaker, the ground cable and the anode of the microphone, respectively; and after the headset plug is detected to be plugged in a headset jack, disconnecting connections between the anodes of the microphone and of the at least one speaker and the corresponding interfaces of the Bluetooth headset main-board, and switching an audio channel from a Bluetooth headset audio channel to a common headset audio channel which corresponds to the headset jack.

In an embodiment of the method provided in the present invention, the corresponding interfaces of the Bluetooth headset main-board are connected to the anodes of the microphone and the at least one speaker specifically through at least two electronic switches; the connection is specifically controlled by closing or disconnecting the at least two electronic switches.

In an embodiment of the method provided in the present invention, the closing or disconnecting of the at least two electronic switches are specifically controlled by a switch closing instruction or a switch disconnecting instruction sent by the Bluetooth headset main-board.

In an embodiment of the method provided in the present invention, the headset further includes a selection button, a user is able to select between a common headset mode and a Bluetooth headset mode through the selection button; the closing or disconnecting of the at least two electronic switches is specifically controlled by the selection button.

The method embodiment provided in the present invention corresponds to the foregoing embodiment of the headset capable of switching the headset mode; for details, reference may be made to the foregoing description of the corresponding part, which is not repeatedly described here again.

In the method embodiment provided in the present invention, the Bluetooth headset mode may be switched to the common headset mode; when a Bluetooth headset runs out of power, a common headset can still be used and power consumption of an electronic product can be decreased; the two headset modes share the microphone and the speaker, so as to increase the component utilizing efficiency, reduce the cost, save the volume of the headset, and be convenient for the user to carry and use.

It should be noted that, in the headset, the terminal, and the method capable of switching the headset mode provided in the embodiments of the present invention, it may also be switched from the common headset mode to the Bluetooth headset mode. After pulling out the headset plug from the corresponding headset jack by the user, a Bluetooth headset module is activated by pressing a power button of the Bluetooth headset module; after the Bluetooth handset main-board is powered on, an initial switch closing instruction is sent to the at least two electronic switches to switch the at least two electronic switches from a disconnected state to a closed state, that is, the Bluetooth headset mode is able to be used, thereby achieving the switching from the common headset mode to the Bluetooth headset mode. A control button can also be set on the headset to control the closing and disconnecting of the at least two electronic switches. Through pressing or selecting the control button by the user, a free switching between the two headset modes can be achieved. The method for controlling the disconnecting or closing of the at least two electronic switches is not limited, and the method of switching between the two headset modes is also not limited in the present invention, and conventional methods can be adopted. These all fall within the protection scope of the present invention.

Persons of ordinary skill in the art may understand that, all or a part of steps in the method according to the foregoing embodiment may be accomplished by a program instructing relevant hardware. The program may be stored in a readable storage medium of a terminal. When the program is executed, all or a part of the foregoing processes are included. The storage medium may be FLASH, EEPROM, and so on.

The objectives, the technical solutions, and the beneficial effects of the present invention are described in further detail through the foregoing specific implementation manners. It should be understood that different embodiments can be combined and the foregoing descriptions are merely specific implementation manners of the present invention, but not intended to limit the protection scope of the present invention. Any combination, modification, equivalent replacement, or improvement made within the spirit and principle of the present invention should fall within the protection scope of the present invention.

What is claimed is:

1. A headset capable of switching a headset mode, comprising: a Bluetooth headset body, a microphone, and at least one speaker;

the Bluetooth headset body is configured to perform Bluetooth communication and transmit an audio signal, and it comprises a Bluetooth headset main-board and a battery supplying power to the Bluetooth headset main-board, and interfaces provided by the Bluetooth headset main-board comprise the interfaces for the microphone and the speaker, wherein anodes of the microphone and the at least one speaker are connected to the corresponding interfaces of the Bluetooth headset main-board, respectively, and their cathodes are connected to a ground cable, respectively, and the headset further comprises:

a headset plug, configured to transmit the audio signal after being plugged in an external headset jack; wherein interfaces of the headset plug are correspondingly and electrically connected to the anode of the at least one speaker, the ground cable, and the anode of the microphone, respectively; and connections between the anodes of the microphone and of the at least one speaker and the corresponding interfaces of the Bluetooth headset main-board are disconnected after the headset plug is plugged in the external headset jack.

2. The headset according to claim 1, wherein the headset further comprises at least two electronic switches; the anodes of the microphone and the at least one speaker are connected to the corresponding interfaces of the Bluetooth headset main-board specifically through the at least two electronic switches; and the connection is disconnected specifically through disconnecting the at least two electronic switches.

3. The headset according to claim 2, wherein the at least two electronic switches are specifically closed or disconnected under the control of a switch closing instruction or a switch disconnecting instruction sent by the Bluetooth headset main-board.

4. The headset according to claim 1, wherein the interfaces of the headset plug being correspondingly and electrically connected to the anode of the at least one speaker, the ground cable, and the anode of the microphone, respectively, is specifically that, each of the interfaces of the headset plug is correspondingly connected, through a connecting line, to the anode of the at least one speaker, the ground line, and the anode of the microphone; and the headset further comprises a line retracting module, configured to accommodate the connecting line and control spreading and retracting of the connecting line.

5. A terminal capable of switching a headset mode, wherein the terminal matches the headset capable of switching the headset mode according to claim 1, and the terminal comprises:

a headset jack, configured to perform transmission of an audio signal after a headset plug is plugged in;

a Bluetooth headset signal transceiver module, configured to perform transmission of signal and data with the Bluetooth headset body in the foregoing headset capable of switching the headset mode; and a processor, configured to, after the headset plug is detected to be plugged in the headset jack, send an audio channel switching instruction to the Bluetooth headset signal transceiver module, and switch an audio channel from a Bluetooth headset audio channel to a common headset audio channel which corresponds to the headset jack.

6. A method capable of switching a headset mode, wherein one headset comprises a Bluetooth headset body, a headset plug, a microphone, and at least one speaker, wherein the Bluetooth headset body is configured to perform Bluetooth communication and transmit an audio signal, and it comprises a Bluetooth headset main-board and a battery supplying power to the Bluetooth headset main-board, and interfaces provided by the Bluetooth headset main-board comprise the interfaces for the microphone and the speaker, and anodes of the microphone and the at least one speaker are connected to the corresponding interfaces of the Bluetooth headset main-board, respectively, and their cathodes are connected to a ground cable, respectively;

the method comprises:

correspondingly and electrically connecting the interfaces of the headset plug and the anode of the at least one speaker, the ground cable, and the anode of the microphone, respectively; and after the headset plug is detected to be plugged in a headset jack, disconnecting connections between the anodes of the microphone and of the at least one speaker and the corresponding interfaces of the Bluetooth headset main-board, and switching an audio channel from a Bluetooth headset audio channel to a common headset audio channel which corresponds to the headset jack.

7. The method according to claim 6, wherein the anodes of the microphone and the at least one speaker are connected to the corresponding interfaces of the Bluetooth headset main-board specifically through at least two electronic switches, and the connection is controlled specifically through closing or disconnecting the at least two electronic switches.

8. The method according to claim 7, wherein the closing or disconnecting the at least two electronic switches are specifically controlled by a switch closing instruction or a switch disconnecting instruction sent by the Bluetooth headset main-board.

9. The method according to claim 7, wherein the headset may further comprise a selection button, a user can select between a common headset mode and a Bluetooth headset mode through this selection button, and the closing or disconnecting the at least two electronic switches is specifically controlled by the selection button.

* * * * *